US011003208B2

(12) United States Patent
Hendren et al.

(10) Patent No.: US 11,003,208 B2
(45) Date of Patent: May 11, 2021

(54) DISPLAY HAVING OPTICAL FILMS WITH BENT ALIGNMENT STRUCTURES

(71) Applicant: Apple Inc., Cupertino, CA (US)

(72) Inventors: Keith J. Hendren, San Francisco, CA (US); Adam T. Garelli, Morgan Hill, CA (US); Bryan W. Posner, San Francisco, CA (US); Dinesh C. Mathew, San Francisco, CA (US); Mengyang Liang, Sunnyvale, CA (US); Eric Benson, San Mateo, CA (US); Victor Yin, Cupertino, CA (US); Jun Qi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/412,285

(22) Filed: May 14, 2019

(65) Prior Publication Data

US 2020/0192422 A1 Jun. 18, 2020

Related U.S. Application Data

(60) Provisional application No. 62/781,350, filed on Dec. 18, 2018.

(51) Int. Cl.
*F21V 7/04* (2006.01)
*G06F 1/16* (2006.01)
(Continued)

(52) U.S. Cl.
CPC ......... *G06F 1/1601* (2013.01); *G02B 6/0055* (2013.01); *G02F 1/133528* (2013.01); *G02F 1/133603* (2013.01); *G06F 1/1616* (2013.01)

(58) Field of Classification Search
CPC .... G02B 6/0088; G02B 6/005; G02B 6/0051; G02B 6/0025; G02B 6/0053;
(Continued)

(56) References Cited

U.S. PATENT DOCUMENTS 9,028,123 B2 5/2015 Nichol et al.
9,690,032 B1 6/2017 Nichol et al.
(Continued)

FOREIGN PATENT DOCUMENTS

CN 200972512 Y 11/2007
CN 202171162 U 3/2012
(Continued)

*Primary Examiner* — William J Carter
*Assistant Examiner* — Omar Rojas Cadima
(74) *Attorney, Agent, or Firm* — Treyz Law Group, P.C.; G. Victor Treyz; David K. Cole

(57) ABSTRACT

An electronic device such as a laptop computer or other device may have a housing. A display may be coupled to the housing. The display may have a pixel array configured to display an image. Backlight illumination for the pixel array may be provide by a backlight unit. The backlight unit may have a light guide layer. A light source may provide light to an edge of the light guide layer. The light guide layer may scatter the light outwardly to serve as the backlight illumination for the pixel array. The backlight unit may have optical films interposed between the light guide layer and the pixel array. The optical films may include flexible polymer layers such as diffuser layers and prism films. The optical films may each have a bent alignment portion that bends back on itself while wrapping around an edge of the light guide layer.

19 Claims, 14 Drawing Sheets

(51) Int. Cl.
*F21V 8/00* (2006.01)
*G02F 1/1335* (2006.01)
*G02F 1/13357* (2006.01)

(58) Field of Classification Search
CPC . G02B 6/0065; G02B 6/0093; G02F 2201/54;
G02F 2202/28; G02F 1/133606; G02F
1/133308; G02F 1/1333; G02F 1/1335;
G02F 1/134309; G02F 2001/133325;
B29C 53/04
See application file for complete search history.

(56) References Cited

U.S. PATENT DOCUMENTS

| | | | |
|---|---|---|---|
| 2008/0303979 A1* | 12/2008 | Shimizu | G02F 1/133615 |
| | | | 349/65 |
| 2011/0103041 A1 | 5/2011 | Mathew et al. | |
| 2013/0242600 A1 | 9/2013 | Franklin et al. | |
| 2014/0049983 A1 | 2/2014 | Nichol et al. | |
| 2014/0071370 A1* | 3/2014 | Wang | G02B 6/0088 |
| | | | 349/58 |
| 2014/0092342 A1 | 4/2014 | Franklin et al. | |
| 2015/0362652 A1 | 12/2015 | Hayashi et al. | |
| 2017/0227806 A1 | 8/2017 | Yamamoto et al. | |
| 2018/0156964 A1 | 6/2018 | Song et al. | |
| 2018/0180800 A1* | 6/2018 | Teramoto | G02B 6/0055 |

FOREIGN PATENT DOCUMENTS

| | | | |
|---|---|---|---|
| CN | 102508368 A | | 6/2012 |
| CN | 102865508 A | | 1/2013 |
| CN | 204679742 U | | 9/2015 |
| CN | 108761915 A | | 11/2018 |
| JP | 2011029045 A | * | 2/2011 |
| JP | 2011186179 A | | 9/2011 |
| KR | 10-0905333 B1 | | 7/2009 |

* cited by examiner

DISPLAY HAVING OPTICAL FILMS WITH BENT ALIGNMENT STRUCTURES

This application claims the benefit of provisional patent application No. 62/781,350, filed Dec. 18, 2018, which is hereby incorporated by reference herein in its entirety.

FIELD

This relates generally to electronic devices, and, more particularly, to displays for electronic devices.

BACKGROUND

Electronic devices often include displays. For example, cellular telephones and computers may have displays for presenting information to a user.

Liquid crystal displays have arrays of pixels for presenting images. A backlight unit may be used to provide backlight illumination for the pixels. A backlight unit may contain a light guide layer. The light guide layer may have an edge that receives light from light-emitting diodes and that laterally distributes the light throughout the backlight unit. Optical films such as brightness enhancement films and diffuser layers may overlap the light guide layer. To ensure that the optical films are aligned satisfactorily and do not shift during use of the electronic device, the optical films may be provided with protruding alignment tabs. The alignment tabs may help secure the positions of the optical films, but can consume more lateral space within the electronic device than desired. This can cause the electronic device to have undesirably large inactive border areas.

SUMMARY

An electronic device such as a laptop computer or other device may have a housing. A display may be coupled to the housing. The display may have a pixel array configured to display an image. Backlight illumination for the pixel array may be provide by a backlight.

The backlight may have a light guide layer. A light source such as an array of light-emitting diodes may provide light to an edge of the light guide layer. The light that is received from the light-emitting diodes may be distributed throughout the light guide layer in accordance with the principle of total internal reflection. The light guide layer may having light scattering structures that scatter the light outwardly to serve as backlight illumination for the pixel array.

A stack of optical films such as diffusers and prism films may be interposed between the light guide layer and the pixel array. The optical films may be formed from flexible polymer layers. Edge portions of the flexible polymer layers may bent back on themselves to wrap around an edge of the light guide layer. The optical films may, for example, each have a bent alignment portion that bends back on itself while wrapping around an edge of the light guide layer. The bent alignment portions may include bent edge portions that extend along some or all of the length of the edge of the light guide layer and may include bent protruding tabs.

The bent alignment portions may be coupled to the housing of the electronic device to align the optical films with respect to the housing. This helps prevent misalignment and film wrinkling during use of the electronic device. Adhesive structures such as layers of adhesive and/or adhesive on strips of tape may be used to attach the bent alignment portions to the housing.

If desired, electronic device housings, electronic components, alignment members embedded in display trim members, and/or other structures may serve as alignment posts that are received within alignment openings in the optical films.

DETAILED DESCRIPTION

Figure 1:
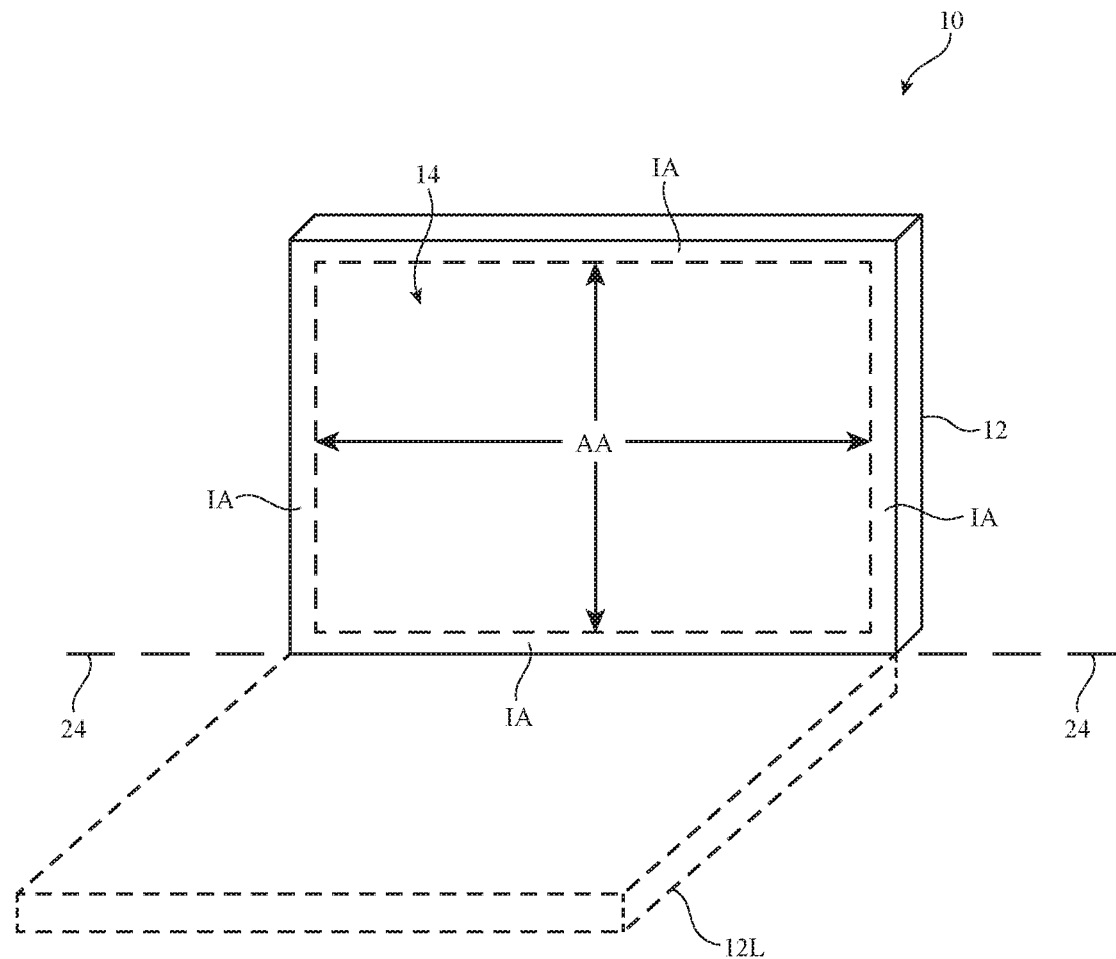
FIG. 1 is a perspective view of an illustrative electronic device such as a laptop computer with a display in accordance with an embodiment.

Electronic devices may include displays. The displays may be used to display images to a user. An illustrative electronic device with a display is shown in FIG. 1. As shown in FIG. 1, device 10 may have a housing such as housing 12 and a display such as display 14 that is mounted in housing 12.

Housing 12 may be a stand-alone housing (e.g., in scenarios in which device 10 is a cellular telephone or tablet computer), may form an upper portion of a two-part housing (e.g., housing 12 may be the upper portion of a laptop housing that also has a lower portion such as lower laptop housing 12L that is coupled to the upper portion by a hinge that allows the upper and lower portions to rotate with respect to each other about hinge axis 24), may be supported on a stand (e.g., when housing 12 forms a desktop computer housing), may be coupled to straps (e.g., when housing 12 forms a wristwatch enclosure or a housing in a head-mounted device), and/or may have other suitable shapes.

In general, electronic device 10 may be a laptop computer, a computer monitor containing an embedded computer, a tablet computer, a cellular telephone, a media player, or other handheld or portable electronic device, a smaller device such as a wristwatch device, a pendant device, a headphone or earpiece device, a head-mounted device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal support structures or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 may include pixels formed from liquid crystal display (LCD) components or other suitable pixel structures. The pixels may be formed in a pixel array having a rectangular shape, a circular shape, an oval shape, a shape with curved and/or straight edges, a shape with one or more recesses (e.g., a notch), a shape with rounded corners or straight corners, a shape with openings to accommodate speakers and/or other components, and/or other suitable shapes. Display 14 may include an active area such as active area AA (e.g., a rectangular region or a region of other suitable shape that includes rows and columns of pixels forming a pixel array). During operation, the pixels of active area AA display an image for a user of device 10. Active area AA may be surrounded on one or more sides by inactive borders or other display regions that do not contain pixels and that do not emit light for forming images. These inactive display regions are shown as inactive area IA of FIG. 1.

A display cover layer may cover the surface of display 14 or a display layer such as a thin-film transistor layer, color filter layer, or other portion of a display may be used as the outermost (or nearly outermost) layer in display 14. The outermost display layer may be formed from a transparent glass sheet, a clear polymer layer, a transparent structure formed from sapphire or other crystalline material, a transparent ceramic layer, or other transparent member. Coatings such as antismudge coatings, antireflection coatings, and/or antiscratch coatings may be formed on the outermost layer of display 14 and/or other layers of display 14.

Figure 2:
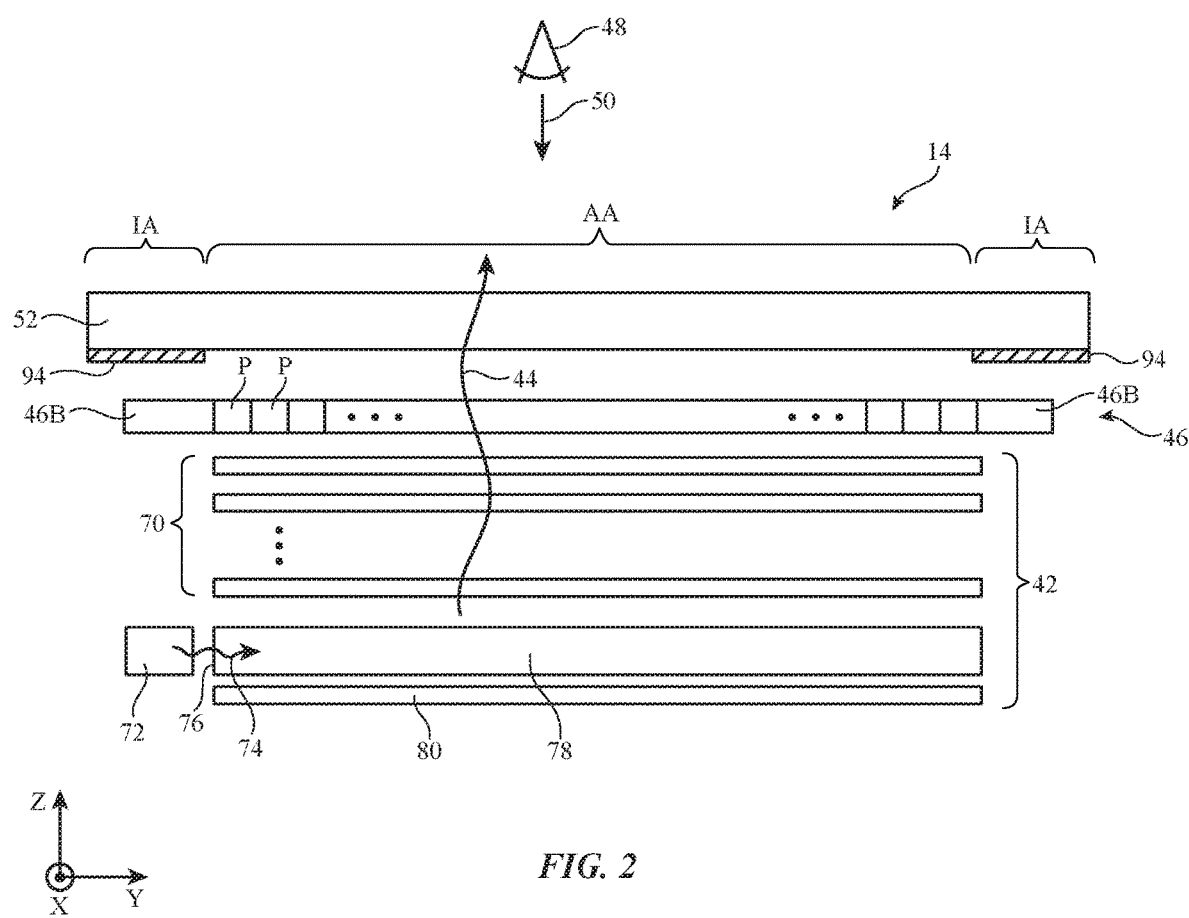
FIG. 2 is a side view of illustrative layers in a display in accordance with an embodiment.

A cross-sectional side view of an illustrative configuration for display 14 of device 10 is shown in FIG. 2. As shown in FIG. 2, display 14 may include backlight structures such as backlight unit 42 for producing backlight illumination such as backlight illumination (backlight) 44. During operation, backlight illumination 44 travels outwards (vertically upwards in dimension Z in the orientation of FIG. 2) and passes through pixels P in display layer 46. Pixels P may, for example, be arranged in an array having rows and columns. The pixel array formed from pixels P is used to display images for a user. Backlight illumination 44 may illuminate the image in the pixels of display layer 46 for a user such as user 48 who is viewing display 14 in direction 50.

Display layer 46 may be mounted in chassis structures such as a plastic chassis structure and/or a metal chassis structure to form a display module for mounting in housing 12 of FIG. 1 or display layer 46 may be mounted directly in housing 12 (e.g., by stacking display layers such as layer 46 into a recessed portion in housing 12). Display layer 46, which may sometimes be referred to as a pixel array layer, pixel array, pixel layer, display, or display module, may be a liquid crystal display formed or other suitable display. Border portion 46B of layer 46 is free of pixels P and does not produce images.

In a configuration in which display layer 46 forms a liquid crystal display, display layer 46 may include a liquid crystal layer interposed between upper and lower layers formed from glass, transparent polymer, or other substrate materials. These upper and lower layers may include thin-film transistor circuitry for forming pixel circuits for pixels P and a color filter array that allows pixels P to display color images. The color filter array and pixel circuits may be formed on a common substrate and/or may be formed on separate substrates located on opposing sides of the liquid crystal layer. The liquid crystal layer and the upper and lower substrate layers may be interposed between opposing upper and lower polarizer layers (e.g., layer 46 may include upper and lower polarizers, upper and lower substrates such as a thin-film transistor layer and a color filter layer and/or other layers with thin-film transistor circuitry and color filter elements for pixels P, and a liquid crystal layer interposed between the upper and lower substrates). Touch sensor electrodes may also be incorporated into layer 46 and/or may be formed on a separate layer in display 14.

During operation of display 14 in device 10, control circuitry (e.g., one or more integrated circuits on a printed circuit) may be used to generate information to be displayed on display 14 (e.g., display data). The information to be displayed may be conveyed to one or more display driver integrated circuits and other display driver circuitry (e.g., thin-film gate drivers, etc.) using a signal path such as a signal path formed from conductive metal traces in a rigid or flexible printed circuit.

Backlight structures 42, which may sometimes be referred to as a backlight unit or backlight, may include a light guide layer such as light guide layer 78. Light guide layer 78 may be formed from a transparent material such as clear glass or polymer (e.g., a thin flexible polymer film or a plate formed from a sheet of transparent glass or polymer). During operation of backlight structures 42, a light source such as light source 72 may generate light 74. Light source 72 may be, for example, an array of light-emitting diodes. If desired, light sources such as light source 72 may be located along multiple edges of light guide layer 78.

Light 74 from light source 72 may be coupled into edge surface 76 of light guide layer 78 and may be distributed in dimensions X and Y throughout light guide layer 78 due to the principle of total internal reflection. Light guide layer 78 may include light-scattering structures such as pits, grooves, or other recess and/or bumps, ridges, or other protrusions. Light scattering structures such as glass particles, microspheres, air bubbles, and/or other structures may also be incorporated within light guide layer 78 to help scatter light 74. The light-scattering structures may be located on an upper surface and/or on an opposing lower surface of light guide layer 78 and/or may be embedded within light guide layer 78.

Light 74 that scatters upwards in direction Z from light guide layer 78 may serve as backlight illumination 44 for display 14. Light 74 that scatters downwards may be reflected back in the upward direction by a reflective film such as reflector 80. Reflector 80 may be formed from a reflective material such as a reflective layer of white plastic, from a thin-film mirror (e.g., a thin-film mirror formed from a stack of dielectric materials), and/or other reflective structures.

To enhance backlight performance for backlight structures 42, backlight structures 42 may include optical films 70. Optical films 70 may include one or more layers of transparent material through which backlight illumination 44 passes between light guide layer 78 and display layer 46 (e.g., flexible polymer films). Optical films 70 may include diffuser layers for helping to homogenize backlight illumination 44 and thereby reduce hotspots and one or more prism films (sometimes referred to as brightness enhancement films) for collimating backlight illumination 44. Compensation films for enhancing off-axis viewing may be included in optical films 70 or may be incorporated into other portions of display 14 (e.g., in polarizer layers in layer 46). In an illustrative configuration, optical films 70 include a first film adjacent to layer 78 such as a diffuser layer, second and third films such as brightness enhancement layers (prism films) that are located above the diffuser layer, and a fourth film above the brightness enhancement layers and adjacent to layer 46. Other configurations for optical films 70 may be used, if desired. Each optical film 70 may be sufficiently thin to be bent back on itself. For example, each optical film 70 may have a thickness of 30-150 microns, at least 20 microns, at least 40 microns, at least 50 microns, less than 300 microns, less than 200 microns, less than 150 microns, or other suitable thickness.

Display 14 may have a protective display cover layer such as layer 52. Layer 52 may be formed from glass, transparent polymer, transparent ceramic, crystalline material such as sapphire, and/or other transparent projective member that overlaps pixels P of display layer 46. If desired, layer 52 may be omitted and one or more layers of display layer 46 may be provided with sufficient thickness to strengthen layer 52 and thereby allow layer 52 to serve as the outermost layer of device 10. To hide internal structures in device 10 from view (e.g., display drive circuitry, interconnect lines, etc.), it may sometimes be desirable to form opaque masking layers on portions of the layers in display 14. As shown in FIG. 2, for example, opaque masking layer 94 may be formed in inactive border area IA of display 14. Masking layer 94 may be formed from a coating of black masking material (e.g., black ink), may be formed from ink or other material of other colors, or may be formed from other opaque material. In active area AA of display 14, an opening is present in layer 94 so that user 48 may view an image presented using pixels P of layer 46. In inactive area IA, the masking layer serves to block pixel-free portions 46B of display layer 46 and other internal structures from view from the exterior of device 10.

Figure 3:
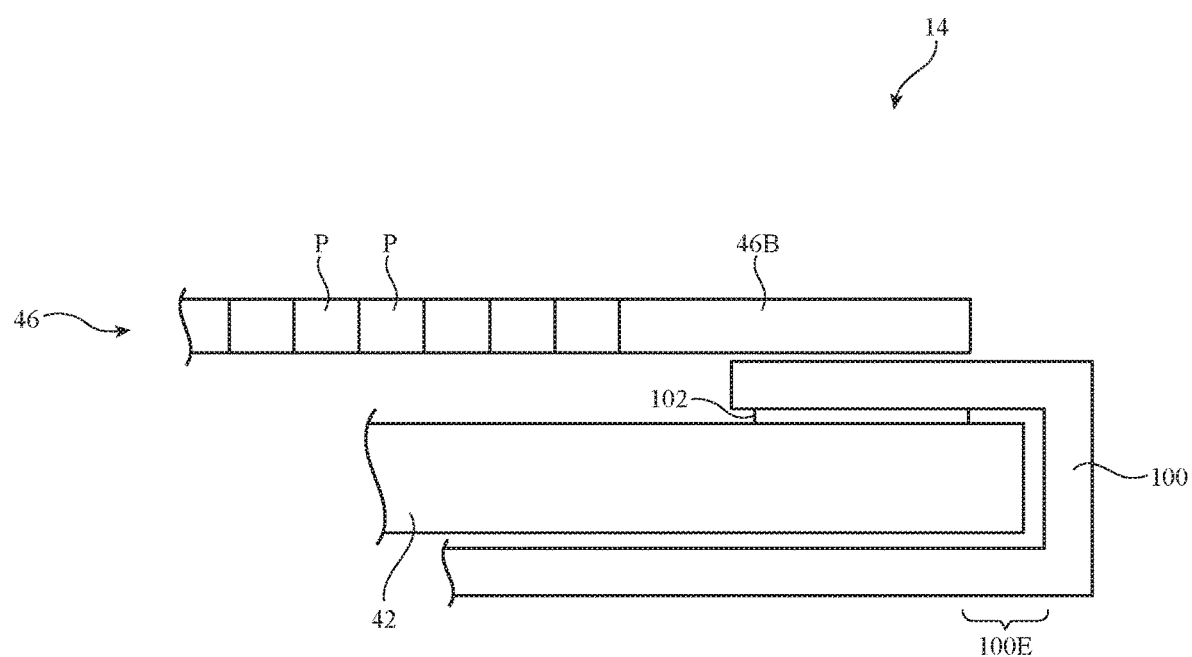
FIG. 3 is a side view of illustrative display layers in accordance with an embodiment.

If desired, device 10 and the display structures in device 10 may have support structures (sometimes referred to as chassis structures, support structures, housing structures, frame structures, etc.). Consider, as an example, the arrangement of FIG. 3. FIG. 3 is a cross-sectional side view of an edge portion of display 14 showing how backlight structures 42 can be supported within a support structure such as support structure 100 (e.g., a portion of housing 12 and/or other support structures). Foam 102 or other material may be interposed between backlight structures 42 and support structure 100 (e.g., to help hold light guide layer 78 and other display layers in place). Display layer 46 may overlap backlight structures 42 and may receive backlight illumination 44 from structures 42. Light source 72 may be mounted in portion 100E of support structure 100 (as an example). Support structure 100 may be a supporting chassis (metal and/or polymer structures such as polymer chassis structures that have been overmolded on metal chassis structures), may be an internal frame structure, may be an exterior housing wall in housing 12, and/or may form other housing structures for housing 12 of device 10. The illustrative support structures of FIG. 3 are illustrative. Other supporting arrangements for backlight structures 42 may be used, if desired.

To prevent optical films 70 from shifting during use (e.g., moving excessively in the X-Y plane of FIG. 2) and to help prevent undesired wrinkling of optical films 70, optical films 70 may have alignment structures. These alignment structures may include, for example, protruding tabs or other portions that can be secured to support structures 100 (e.g., that can be coupled to housing 12 and/or other support structures). To help avoid undesirably enlarging the size of inactive borders in display 14 (e.g., to minimize the width of inactive area IA), these alignment portions may be bent so that these alignment portions fold back on themselves while wrapping around one or more layers in backlight structures 42 such as light guide layer 78 and/or reflector 80.

The alignment portions, which may sometimes be referred to as bent alignment portions, may form bent protruding tabs or other alignment portions that are wrapped around the edge of light guide layer 78 so that the alignment portions of the light guide layer fold back on themselves after wrapping around light guide layer 78. By configuring protruding tabs on optical films 70 to double back on themselves (e.g., when viewed from above along dimension Z), these tabs do not extend excessively in lateral dimensions X and Y, thereby helping to minimize inactive border regions in display 14. At the same time, the presence of the alignment portions of optical films 70 may help align and secure films 70 at desired locations within display 14 and device 10.

Figure 4:
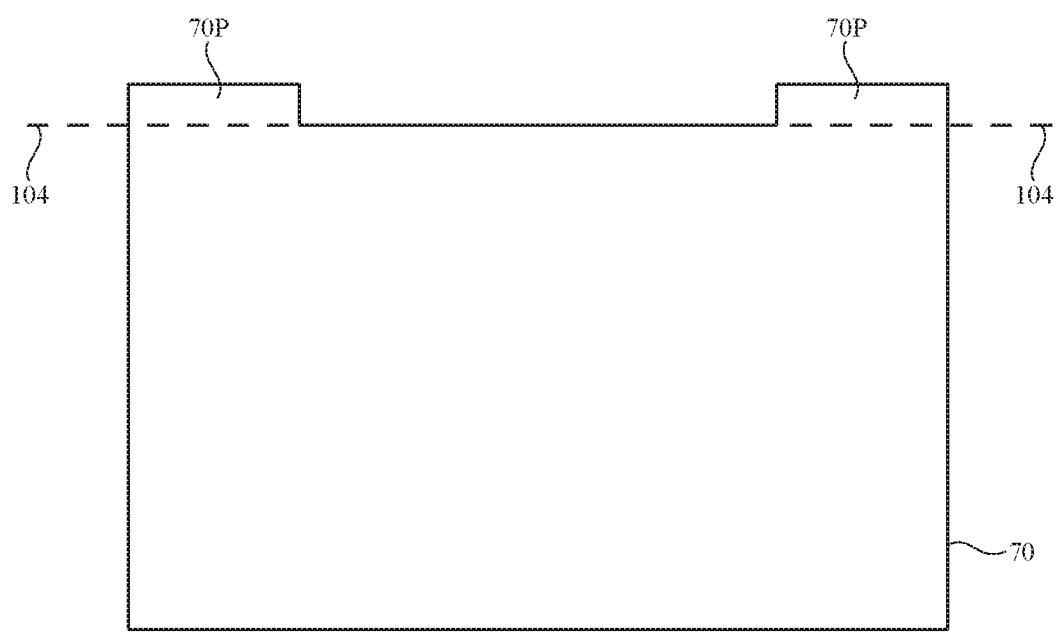
FIG. 4 is a top view of an illustrative optical film with alignment tabs in accordance with an embodiment.

FIG. 4 is a top view of an illustrative optical film with portions that may be used to form bent alignment portions such as bent protruding tabs or bent edge portions that extend along some or all of the length of the edge of a light guide layer. As shown in FIG. 4, optical film 70 may have protrusions or other portions forming alignment structures such as alignment portions 70P. Alignment portions such as alignment portions 70P of FIG. 4 may protrude from one of the four sides of optical film 70 and may be bent about bend axis 104 when installed in device 10 to form part of backlight structures 42. For example, bent alignment portions such as portions 70P of FIG. 4 may be wrapped around an edge of light guide layer 78 that is aligned with bend axis 104 (and, if desired, an edge of reflector 80 that is aligned with bend axis 104). After being bent around and under a display layer such as light guide layer 78 (e.g., a light guide plate or a flexible light guide film), bent alignment portions 70P of optical film 70 may be attached to support structure 100 (e.g., portions 70P may be coupled to housing 12, an internal display layer chassis, and/or other support structure).

Alignment portions 70P may be formed from a single strip-shaped edge portion of optical film 70 that is bent about a bend axis such as bend axis 104 of FIG. 4 along one of the edges of film 70, may be an edge portion that runs along part of an edge of light guide layer 78, may include one or more protrusions forming tabs (as shown in the example of FIG. 4), may have openings that receive alignment pins or other alignment structures coupled to support structure 100 or other structures in device 10, and/or may have other suitable configurations. As described in connection with FIG. 2, backlight structures 42 may include multiple optical films 70. Backlight structures 42 may include, for example, at least two optical films 70, at least three optical films 70, at least four optical films 70, fewer than 10 optical films 70, and/or any other suitable number of optical films 70. Each of these optical films 70 may have one or more alignment portions such as bent alignment portions 70P that are bent back on themselves (while wrapping around the edge of light guide layer 78 and, if desired, the edge of reflector 80) so that these bent alignment portions 70P may be secured in place relative to housing 12 and thereby align films 70 within device 10.

Figure 5:
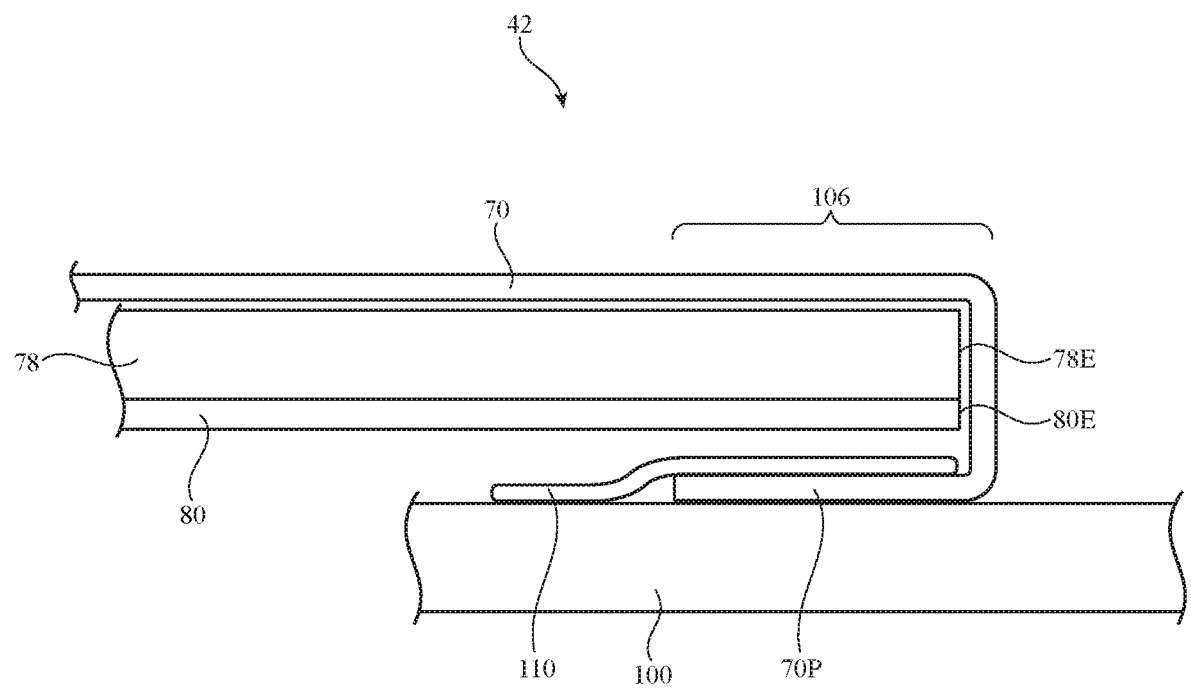
FIGS. 5 and 6 are cross-sectional side views of illustrative displays in which optical films have been bent to wrap around the edges of light guide layers in accordance with embodiments.
Figure 6:
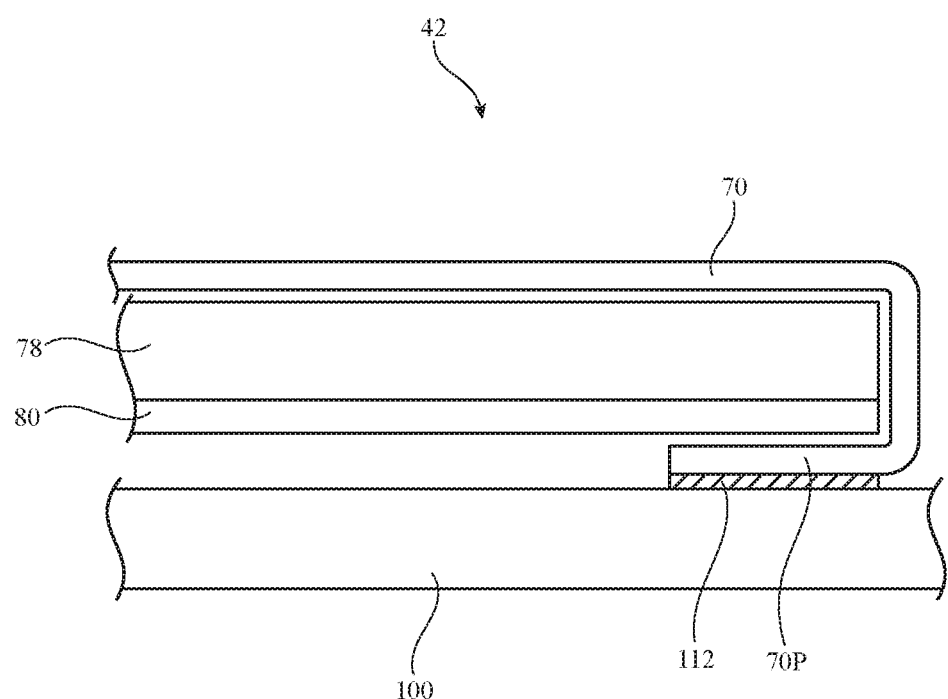

Tape (e.g., pressure sensitive adhesive on a polymer film substrate), a layer of pressure sensitive adhesive, other adhesive, pins or other physical alignment structures, fasteners, and/or other attachment mechanisms may be used to attach each optical film 70 to support structure 100 (e.g., a display chassis or other internal housing structure, a housing wall in housing 12, and/or other support structure). Consider, as an example, the cross-sectional side view of the portion of backlight structures 42 that is shown in FIG. 5. As shown in FIG. 5, backlight structures 42 may include light guide layer 78 and reflector 80. One or more optical films such as illustrative optical film 70 may be included in backlight structures 42. As shown in FIG. 5, optical film 70 may have a bent alignment portion such as bent alignment portion 70P (e.g., a bent edge portion or bent protruding tab) that is wrapped around peripheral edge 78E of light guide layer 78 and peripheral edge 80E of reflector 80. In this way, film 70 doubles back on itself in edge region 106, rather than extending outwardly in lateral dimensions X and Y. Tape 110 and/or other attachment structures may be used to attach bent alignment portion 70P to support structure 100 to secure each film 70 in backlight structures 42. Edges 78E and 80E may run along the upper edge of display 14 and/or other peripheral edges of display 14. As shown in FIG. 6, a layer of adhesive such as adhesive layer 112 (e.g., an adhesive layer that is not supported by a tape substrate) may be used to attach bent alignment portion 70P to support structure 100. Adhesive layer 112 may be a layer of pressure sensitive adhesive or other adhesive.

Figure 7:
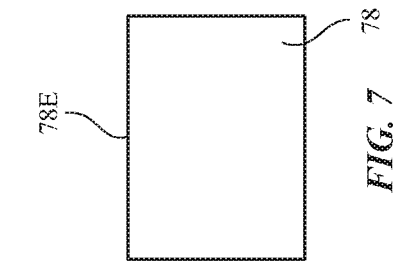
FIG. 7 is a top view of an illustrative light guide layer for a display in accordance with an embodiment.

Illustrative layers for use in backlight structures 42 are shown in FIGS. 7, 8, 9, 10, and 11. FIG. 7 is a top view of light guide layer 78, showing how light guide layer 78 may have a rectangular outline (as an example). FIGS. 8, 9, 10, and 11 are top views of four illustrative optical films 70. Film F1 of FIG. 8, which may be a diffuser, may be placed adjacent to the upper surface of layer 78. Film F2 of FIG. 9, which may be a brightness enhancement film, may be placed on top of and adjacent to film F1. Film F3 of FIG. 10, which may be an additional brightness enhancement film, may be placed on top of an adjacent to film F2. Film F4 of FIG. 11, which may be an additional diffuser, may be placed between film F3 and display layer 46.

Figure 11:
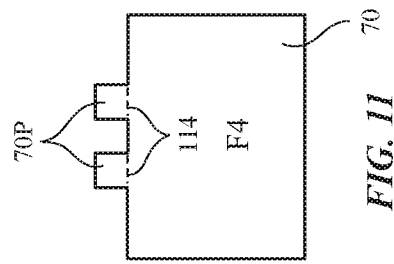
FIGS. 9, 10, and 11 are top views of illustrative optical films with bent alignment portions such as bent protruding tabs in accordance with embodiments.
Figure 10:
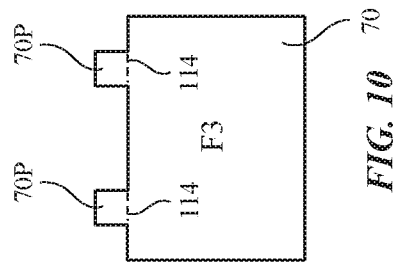
Figure 9:
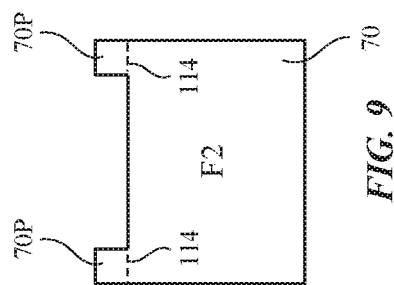
Figure 8:
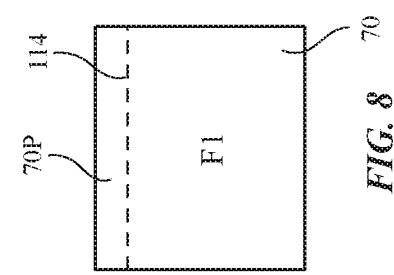
FIG. 8 is a top view of an optical film with a bent alignment portion such as a strip-shaped bent edge portion for alignment of the optical film within a display in accordance with an embodiment.

As shown in FIG. 8, bent alignment portion (alignment portions) 70P of film F1 may form a strip-shaped bent edge portion that bends about line 114 to wrap around edge 78E of layer 78 (FIG. 7). As shown in FIG. 9, bent alignment portions (alignment portion) 70P of film F2 may form bent protruding tabs that wrap around edge 78E. FIGS. 10 and 11 show how films F3 and F4 may have bent alignment portions 70P that form bent protruding tabs that are laterally offset from the tabs of layer F1 (e.g., laterally offset along edge 78E of layer 78). The lateral offsets of the protruding alignment portions 70P in the different films of backlight structures 42 may help allow these portions 70P to be securely taped or otherwise secured to support structure 100 without creating excessive thickness for the tape layers and/or other attachment structures in display 14.

Figure 12:
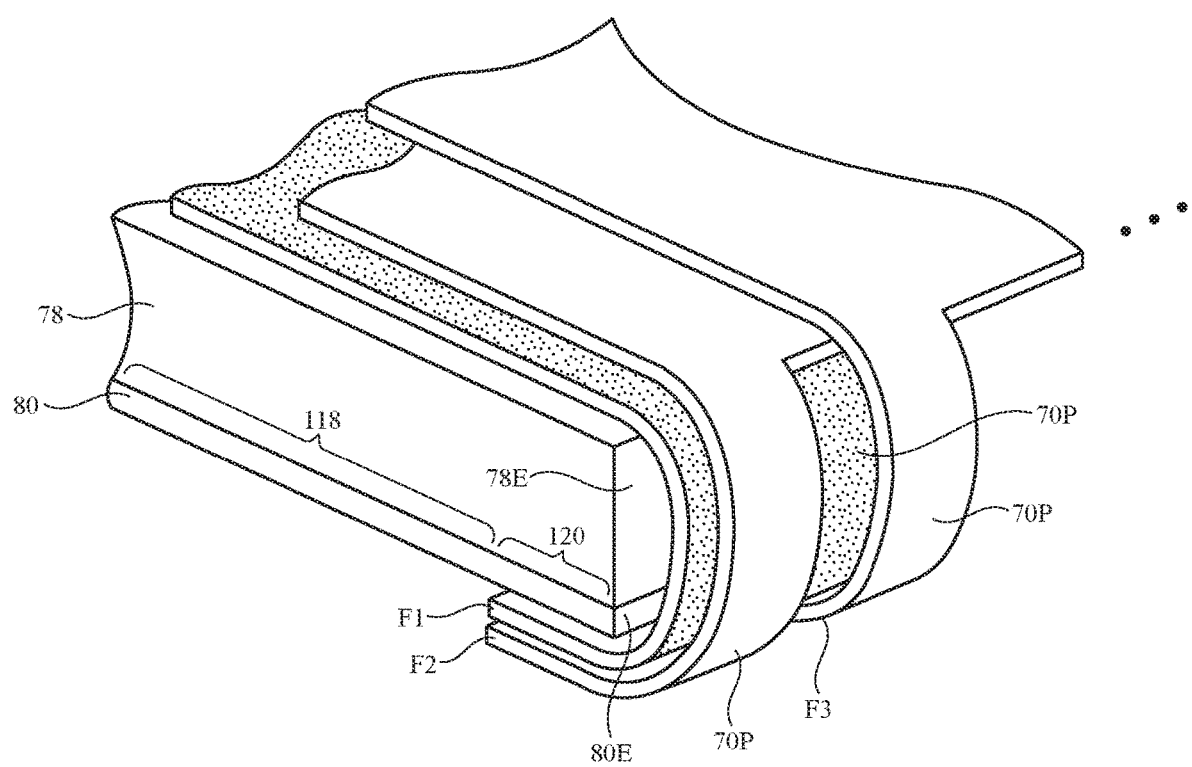
FIG. 12 is a perspective view of a portion of an illustrative display having optical films with bent alignment portions that are wrapped around the edge of a light guide layer in accordance with an embodiment.

To prevent visible artifacts where light escapes between adjacent tabs of films 70, the strip-shaped bent edge portion of lowermost film F1 that forms bent alignment portion 70P of FIG. 8 may extend along the entire length of edge 78E of light guide layer 78 (or at least a portion of the length of edge 78E that is overlapped by tabs in subsequent films). Film F1 may be a diffuser layer that diffuses any light exiting edge 78E so that bright gaps between adjacent film tabs associated with films F2, F3, and F4 may be minimized. This type of arrangement, in which the edge of film F1 runs along the entire length of edge 78E of layer 78 (and, if desired, along all of edge 80E of reflector 80), is illustrated in FIG. 12. Reflector 80 may overlap the entire lower surface of layer 78 (e.g., reflector 80 may overlap central region 118 of layer 78 and border region 120 of layer 78) or reflector 80 may be omitted from some or all of these areas (e.g., reflector 80 may overlap region 118 while being omitted from region 120).

Figure 13:
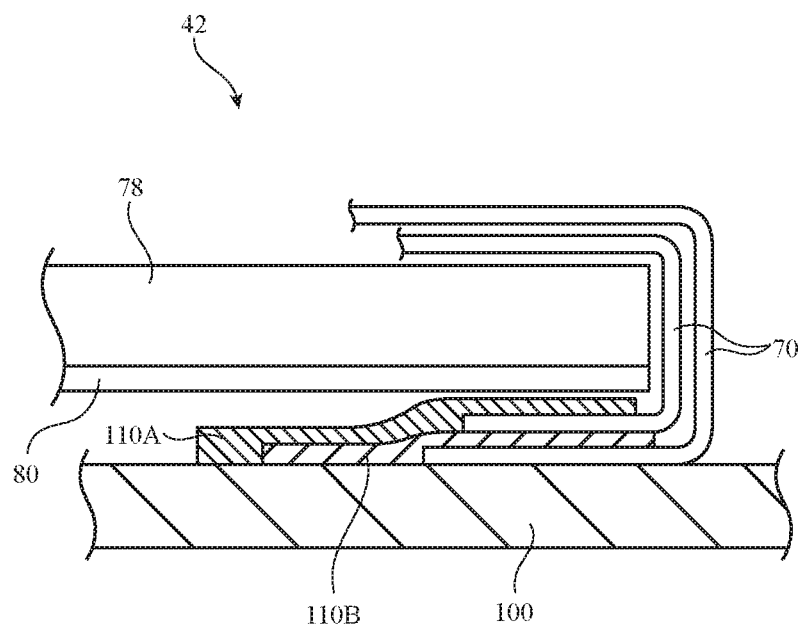
FIGS. 13 and 14 are cross-sectional side views of edge portions of illustrative displays having optical films with bent portions such as bent edge portions wrapped around the edges of light guide layers in accordance with embodiments.
Figure 14:
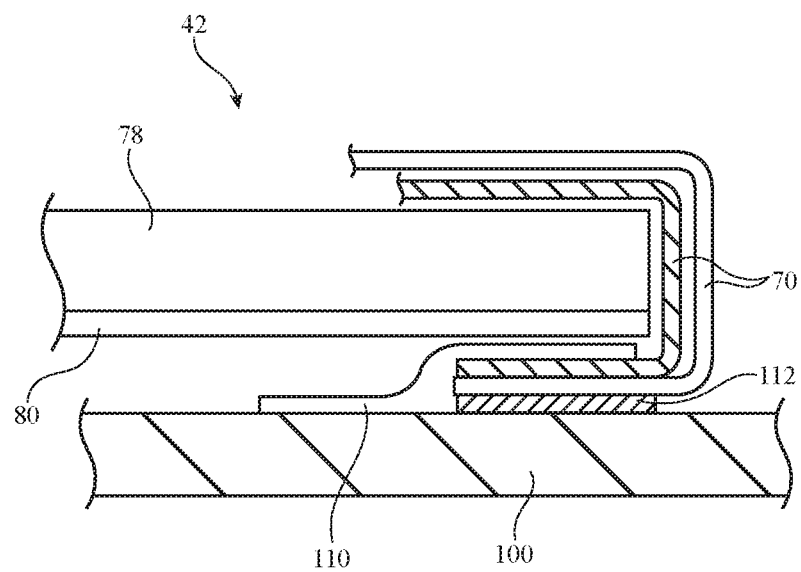

As described in connection with FIGS. 4 and 5, tape, adhesive, and/or other attachment mechanisms may be used in attaching films 70 to support structure 100. FIG. 13 is a cross-sectional side view of a portion of backlight structures 42 in an illustrative arrangement in which two tape layers such as first tape layer 110A and second tape layer 110B are being used to attach films 70 to support structure 100. FIG. 14 is a cross-sectional side view of a portion of backlight structures 42 in an illustrative arrangement in which tape layer 110 and adhesive layer 112 are being used to attach films 70 to support structure 100.

Figure 15:
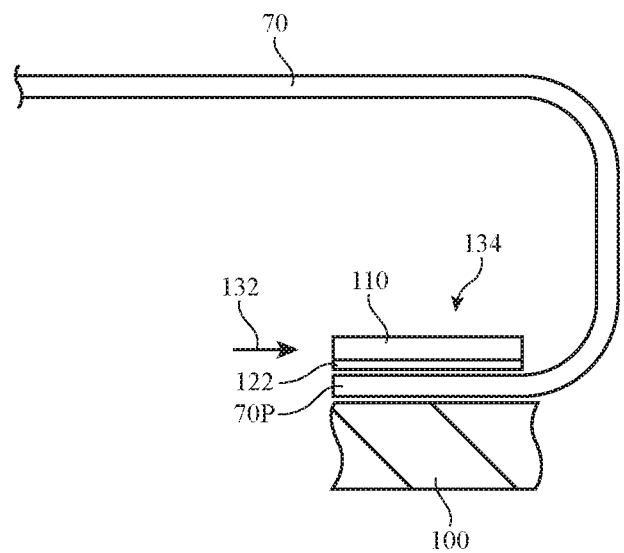
FIG. 15 is a cross-sectional side view of an illustrative optical film with a bent edge portion secured to a support structure such as a housing wall or other device structure in accordance with an embodiment.

To allow for potential expansion and contraction of films 70 during changes in temperature (due to the non-zero coefficient of thermal expansion that may be associated with films 70), it may be desirable to attach one or more bent alignment portions of films 70 to support structure 100 with a sliding joint such as sliding joint 134 of FIG. 15. Sliding joint 134 couples film 70 to support structure 100 while allowing for slight lateral movement of film 70 relative to support structure 100. As shown in FIG. 15, portion 70P of film 70 may be secured to housing 100 using tape layer 110 and an intervening layer of material with an underside that is not covered with adhesive such as polymer layer 122. Polymer layer 122 has a surface facing portion 70P that is free of adhesive and that therefore creates a non-sticky area of layer 122 that allows portion 70P to slide relative to layer 122.

Figure 16:
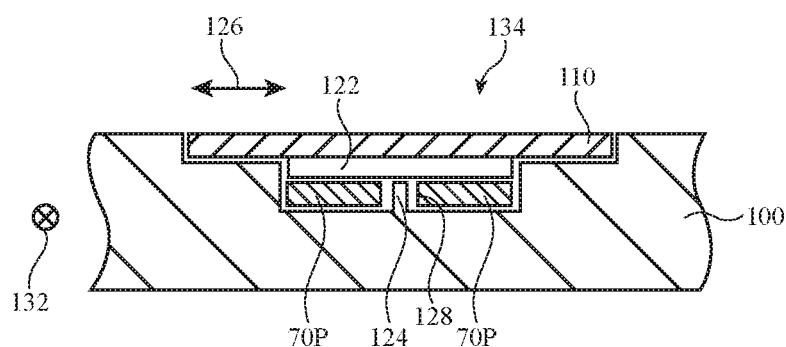
FIGS. 16 and 17 are cross-sectional views of illustrative optical film structures attached to support structures in accordance with embodiments.

FIG. 16 is a cross-sectional side view of an alignment tab attachment structure such as sliding joint 134 of FIG. 15 viewed in direction 132 of FIG. 15. As shown in FIG. 16, polymer layer 122 is interposed between the lower surface of tape layer 110 and alignment portion 70P. The presence of polymer layer 122 between tape layer 110 and alignment portion 70P prevents the sticky adhesive-covered lower surface of tape 110 from fixing the position of portion 70P. As a result, portion 70P and nearby portions of film 70 can slide laterally (e.g., horizontally in the arrangement of FIG. 16) to accommodate thermal expansion of film 70. If desired, support structure 100 or other portion of device 10 may have a physical alignment structure such as pin 124 that mates with a corresponding feature in film 70 such as alignment opening 128 in film 70. Opening 128 may have a circular shape, square shape, an elongated shape such as a rectangular slot shape or other slot configuration, the shape of a notch or other recess, and/or other opening shape. Opening 128 may receive pin 124 as shown in FIG. 16.

In the illustrative configuration used for sliding joint 134 of FIG. 16, opening 128 is a slot that allows portion 70P to slid slightly to the left and right in the orientation of FIG. 16 (e.g., parallel to edge 78E of light guide layer 78 in backlight structures 42), but that is sufficiently narrow in the orthogonal direction (in and out of the page of FIG. 16) to constrain excess motion in this orthogonal direction. A sliding joint such as sliding joint 134 of FIG. 16 may, if desired, be used as one of a pair of first and second attachment structures for first and second corresponding alignment tabs in an optical film. A fixed joint may be used for the other of the pair of first and second attachment structures.

Figure 17:
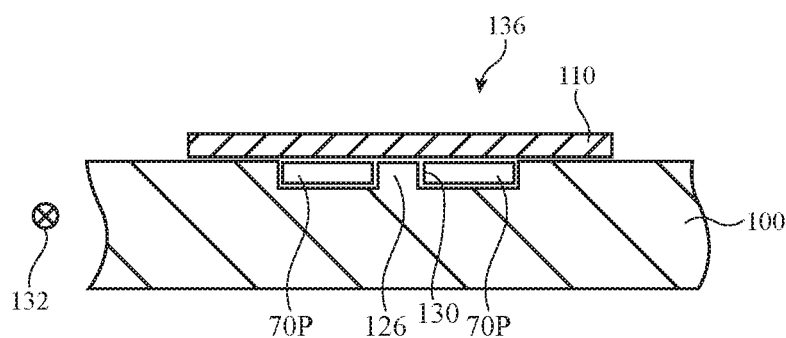

FIG. 17 is a cross-sectional side view of a fixed joint. Fixed joint 136 may not include adhesive-free polymer layer 122, so tape 110 may attach to support structure 100 and the upper surface of portion 70P, thereby fixing portion 70P in place against structure 100. The position of portion 70P is also determined by pin 126 and mating opening 130 in portion 70P. Opening 130 may be configured to have the same size as pin 126, thereby further preventing lateral sliding of portion 70P relative to support structure 100. If desired, an optical film with first and second tabs may have a first tab formed using sliding joint 134 of FIG. 16 and a second tab formed using fixed joint 136 of FIG. 17. Joints such as the tape and adhesive joints of FIGS. 13 and 14 and/or other attachment structures may also be used for securing bent alignment portions 70P of optical films 70, if desired.

Figure 18:
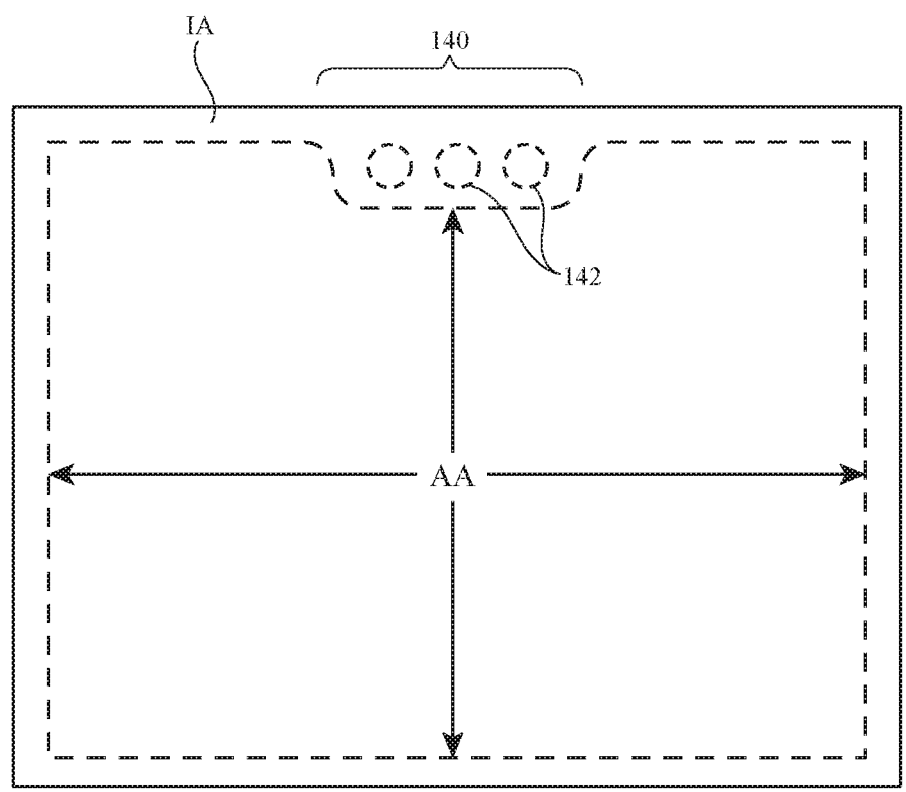
FIG. 18 is a top view of an illustrative display having an active area with a recess such as a notch running along the edge of the active area in accordance with an embodiment.

As shown in FIG. 18, active area AA of display 14 may have one or more straight sides and one or more sides that are not straight. Active area AA of display 14 of FIG. 18 has a top edge that has a recessed portion such as recess 140. The presence of recess 140, which may sometimes be referred to as a notch, opening, or notch-shaped recess, may create additional inactive area (e.g., the strip of inactive area IA running along the upper edge of display 14 of FIG. 18 may be locally widened). Electrical components 142 may be mounted in this inactive notch-shaped area. Components 142 may include optical components such as image sensors, light-emitting diodes, lasers, and other light sources, optical proximity sensors, color ambient light sensors, three-dimensional image sensors (e.g., structured light sensors that project light beams to create dots and that have image sensors for capturing images of the dots to determine the three-dimensional shape of an object), and/or other sensors that emit and/or detect visible light, infrared light, and/or ultraviolet light.

Figure 19:
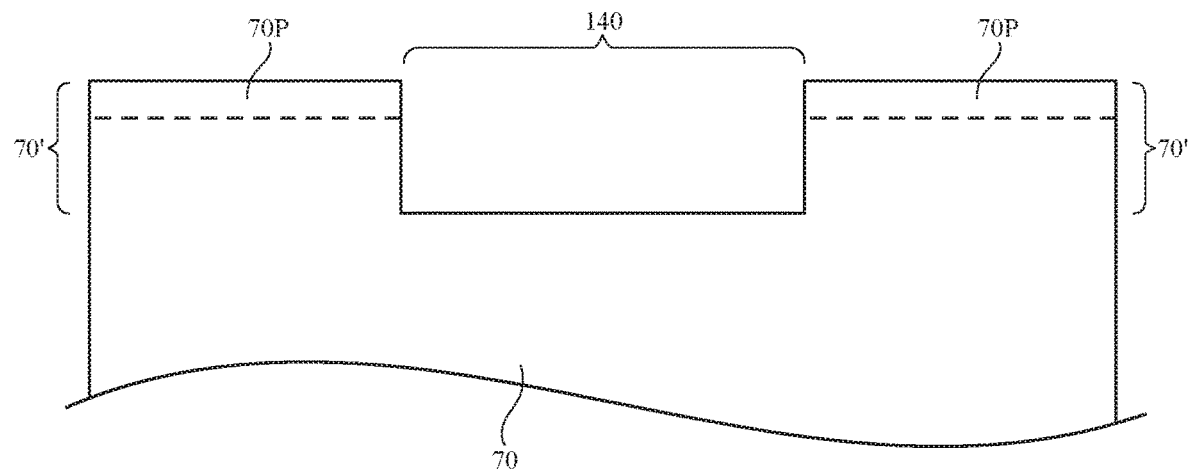
FIG. 19 is a top view of an edge of an illustrative display having a flexible optical film with a bent alignment portion and a notch in accordance with an embodiment.
Figure 20:
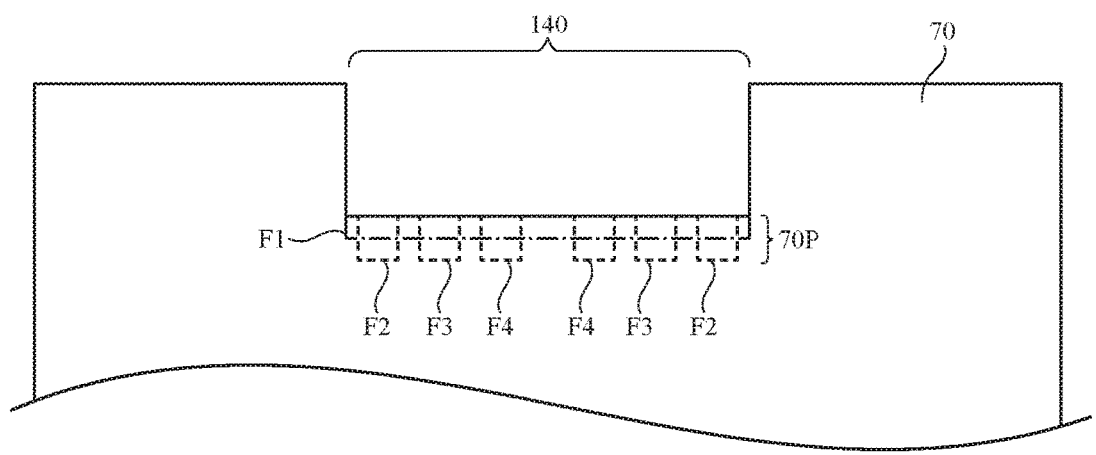
FIG. 20 is a top view of an edge of an illustrative display having flexible optical films with bent protruding tabs and having a notch in accordance with an embodiment.

Illustrative layouts for optical films 70 that may be used in a notched display such as display 14 of FIG. 18 are shown in FIGS. 19 and 20.

As shown in FIG. 19, optical film 70 may have portions 70' that are located along left and right edge portions of a light guide layer on opposing ends of notch 140. The tips of portions 70' may form bent alignment tabs such as portion 70P. Portions 70P (e.g., bent edge portions that extend along the full edge of each of portions 70' and/or bent protruding tabs formed in portions 70P) may be wrapped around edge 78E of light guide layer 78 in backlight structures 42 (e.g., around left and right portions of edge 78E on opposing sides of notch 140).

In the example of FIG. 20, bent alignment portions for optical films 70 have been formed along the edge of layers 70 at the base of notch 140 (e.g., along a portion of edge 78 that lies in notch 140). Film F1 may have a bent edge portion that is wrapped around the edge of layer 78 along the entire width of notch 140 and films F2, F3, and F4 may have bent protruding tabs and/or other bent alignment portions may be formed in notch 140. Configurations in which bent alignment portions are formed in both the out-of-notch locations of FIG. 19 and the in-notch locations of FIG. 20 may also be used, if desired.

Figure 21:
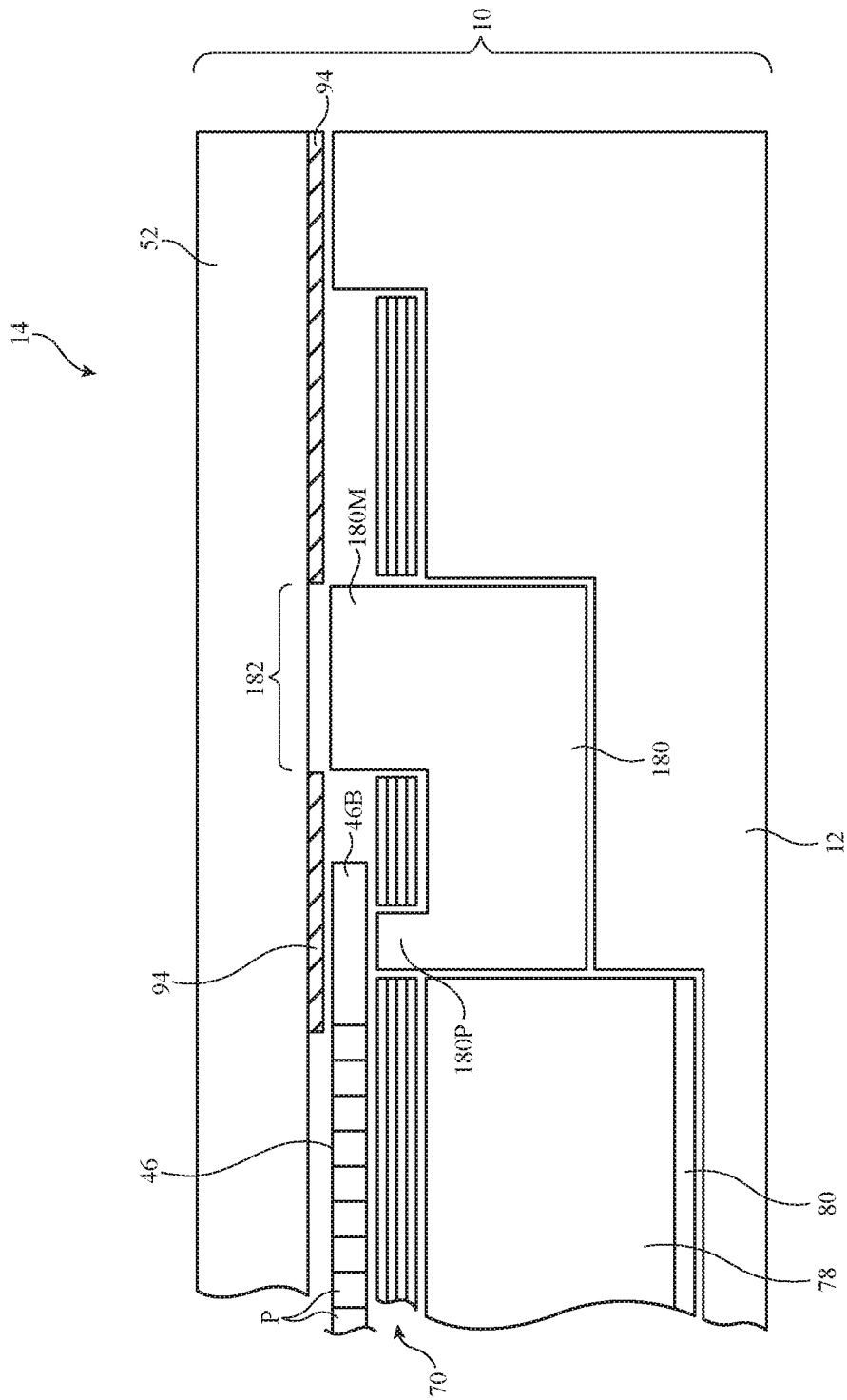
FIG. 21 is a cross-sectional side view of an illustrative display having an inactive area with a camera or other electrical component that is configured to serve as an alignment structure for optical films in the display in accordance with an embodiment.

FIG. 21 is a cross-sectional side view of a portion of display 14 showing how a camera or other electrical components may be used to help align optical films 70. Display 14 of electronic device 10 may have a protective outer layer. The protective outer layer may protect pixels P of display layer 46. The protective outer layer may be formed by the outermost substrate within layer 46 or, as shown in FIG. 21, may be formed by display cover layer 52. Ink or other opaque masking material 94 may having an opening (window) such as opening 182 that is aligned with component 180. For example, component 180 (e.g., one of components 142 of FIG. 18) may have a portion such as portion 180M that receives and/or transmits light through opening 182. Component 180 may be an electrical component such as an optical component or other electrical component. As an example, component 180 may be an ambient light sensor, a camera (e.g., a digital image sensor with a lens), a three-dimensional sensor such as a structured light sensor, an optical proximity sensor, a camera flash, and/or other optical component. If desired, component 180 may be an audio component (e.g., a speaker or microphone) and/or other electrical component.

As shown in FIG. 21, portions of component 180 and/or associated supporting structures may be used as alignment structures (sometimes referred to as alignment pins or alignment posts). As examples, main portion 180M of component 180 may serve as an alignment structure that protrudes into a corresponding alignment opening in optical films 70 or ancillary protruding portion 180P of component 180 may serve as an alignment structure that is received within a corresponding alignment opening in optical films 70. The portions of component 180 that serve as optical film alignment structures may be formed from polymer, metal and/or other materials and may serve as electrical component housing structures and/or electrical component mounting structures. For example, in an arrangement in which component 180 is a camera, portions of a polymer housing for the camera may be used to form alignment structures such as portions 180M and/or 180P. Mounting brackets and/or other component mounting structures may also be used to form alignment structures (e.g., alignment pins) that are received within corresponding alignment openings in films 70. The openings in films 70 may have slot shapes (e.g., to allow lateral film movement from expansion and contraction due to temperature fluctuations) and/or other suitable shapes (e.g., circular or square shapes to receive alignment structures that help prevent lateral film movement).

Figure 22:
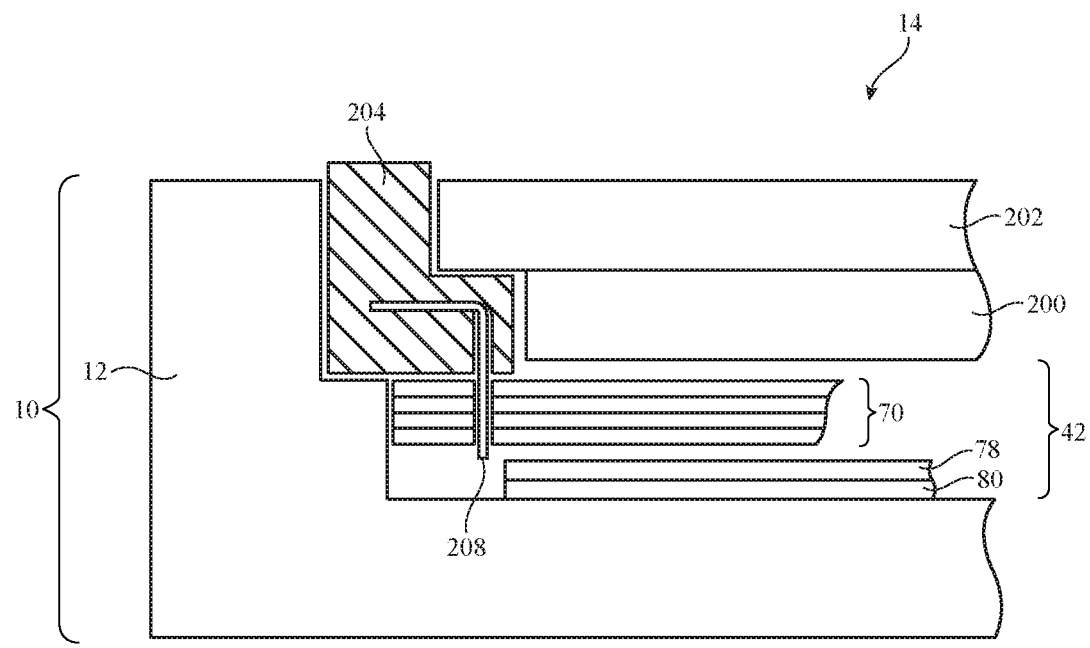
FIG. 22 is a cross-sectional side view of an illustrative display having optical films aligned with an alignment pin that is formed from a bent sheet metal member embedded in an overmolded display trim member in accordance with an embodiment.

FIG. 22 is a cross-sectional side view of device 10 in an illustrative configuration in which an alignment structure for optical films has been coupled to a trim member. As shown in FIG. 22, display 14 may include layers such as layers 200 and 202. Layers 200 and 202 may form substrates in layer 46, layer 200 may be formed by a display layer such as layer 46 and layer 202 may form display cover layer 52, and/or layers 200 and 202 may form other structures in display 14 (e.g., structures for forming pixels P). Display 14 may be mounted in housing 12 using an elastomeric gasket, polymer support structures, and/or other supportive structures such as trim member 204. Trim member 204 may, as an example, form a ring-shaped member that surrounds display 14 and prevents display 14 from damage due to direct contact with housing 12. Trim member 204 may be formed from polymer or other material. With one illustrative arrangement, alignment members such as alignment member 208 may be embedded within trim member 204. For example, polymer material for forming trim member 204 may be molded over member 208. Member 208 may be formed from polymer, metal, and/or other material and may have a portion that forms an alignment structure. For example, member 208 may have a downwardly extending portion that forms an alignment post (pin) that is received within a corresponding alignment opening (hole) in optical films 70, as shown in FIG. 22.

Figure 23:
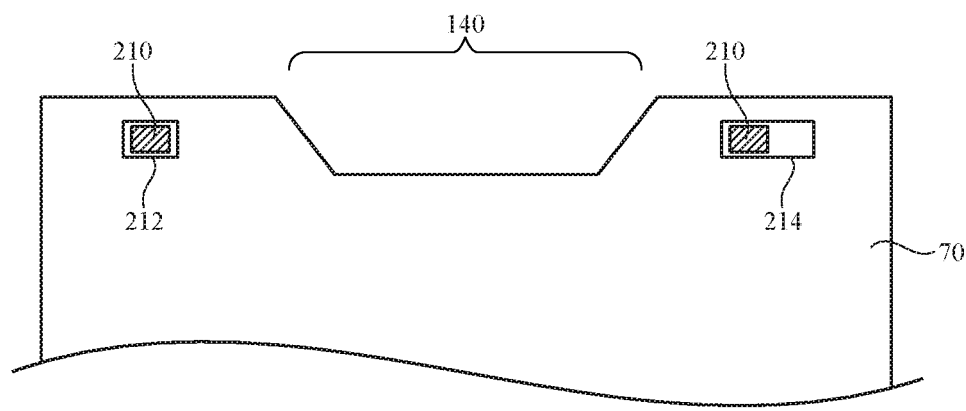
FIG. 23 is a top portion of an edge of an illustrative display showing how display layers such as optical films may have openings that receive alignment structures such as the illustrative alignment pin of FIG. 22 in accordance with an embodiment.

FIG. 23 is a top view of a portion of an illustrative display for device 10 that has a notch (notch 140). Notch 140 may, as an example, be formed along the upper side of display 14 and may be used to accommodate electrical components. FIG. 23 shows how alignment structures such as alignment posts 210 may be received within corresponding alignment openings such as alignment holes 212 and 214 in optical films 70. Illustrative hole 212 has a shape that receives an alignment post 210 without allowing for shifting movement of films 70 (e.g., to form a fixed joint). Illustrative hole 214 has an elongated shape forming a slot that receives an alignment post 210 while allowing for lateral movement of film 70 as films 70 expand and contract due to temperature changes (e.g., to form a sliding joint).

Device 10 may be operated in a system that uses personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In accordance with an embodiment, a display is provided that includes a backlight having a light source, a light guide layer that receives light from the light source and that produces corresponding backlight illumination, pixels that are illuminated with the backlight illumination and that are configured to display an image, and optical films interposed between the backlight and the pixels, the optical films include bent alignment portions that wrap around an edge of the light guide layer.

In accordance with another embodiment, the optical films include a first optical film and a second optical film, the first optical film is interposed between the light guide layer and the second optical film, the edge of the light guide layer has a length and extends between opposing first and second sides of the light guide layer, the first optical film has a bent edge portion that runs along the length of the edge of the light guide layer while wrapping around the edge of the light guide layer, and the second optical film has bent protruding tabs that wrap around respective portions of the edge of the light guide layer.

In accordance with another embodiment, the optical films include a prism film and a diffuser film.

In accordance with another embodiment, the diffuser film has a bent edge portion wrapped around the edge of the light guide layer.

In accordance with another embodiment, the prism film includes first and second bent protruding tabs wrapped around the edge of the light guide layer, a first portion of the bent edge portion is interposed between the first bent protruding tab and the light guide layer, and a second portion of the bent edge portion is interposed between the second bent protruding tab and the light guide layer.

In accordance with another embodiment, the display includes a reflector, the light guide layer and the optical films are interposed between the reflector and the liquid crystal display pixels.

In accordance with an embodiment, an electronic device is provided that includes a support structure, an array of pixels configured to display an image, and a display backlight having a light guide layer that is configured to provide backlight illumination to the array of pixels and having flexible polymer films that are between the light guide layer and the pixels and that have bent alignment portions that wrap around an edge of the light guide layer and are coupled to the support structure.

In accordance with another embodiment, the support structure includes an electronic device housing.

In accordance with another embodiment, the electronic device includes adhesive that attaches the flexible polymer films to the support structure.

In accordance with another embodiment, at least one of the bent alignment portions include a bent protruding tab.

In accordance with another embodiment, the bent protruding tab wraps around the edge and is bent back on itself and the adhesive is configured to attach the bent protruding tab to the electronic device housing.

In accordance with another embodiment, the bent alignment portions include a bent protruding tab, the electronic device includes tape that is configured to couple the bent protruding tab to the electronic device housing.

In accordance with another embodiment, the tape has a non-sticky portion that overlaps the bent protruding tab to form a sliding joint that couples the bent protruding tab to the support structure while allowing the bent protruding tab to slide relative to the support structure.

In accordance with another embodiment, the light guide layer has a notch and the bent alignment portions overlap a portion of the edge in the notch.

In accordance with another embodiment, the light guide layer has a notch and the bent alignment portions overlap portions of the edge out of the notch.

In accordance with an embodiment, an electronic device is provided that includes a housing member, and a display in the housing having a backlight that produces backlight illumination and having a pixel array that is illuminated by the backlight illumination, the backlight includes a light-emitting diode, a light guide layer that receives light from the light-emitting diode and that provides the backlight illumination to the pixel array, and a flexible polymer layer interposed between the light guide layer and the pixel array, the flexible polymer layer has a bent protruding tab that is bent around an edge of the light guide layer and that is secured to the housing member.

In accordance with another embodiment, the electronic device includes adhesive that is configured to secure the bent protruding tab to the housing member.

In accordance with another embodiment, the flexible polymer layer includes a prism film.

In accordance with another embodiment, the electronic device includes tape, the housing member includes a housing wall, and the flexible polymer layer is secured to the housing wall using the tape.

In accordance with another embodiment, the flexible polymer layer includes one of at least four optical films interposed between the light guide layer and the pixel array and the optical films include at least two diffusers and at least two prism films each of which has a respective bent alignment portion coupled to the housing member.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
    a backlight having a light source, a light guide layer that receives light from the light source and that produces corresponding backlight illumination;
    pixels that are illuminated with the backlight illumination and that are configured to display an image; and
    optical films interposed between the backlight and the pixels, wherein the optical films include bent alignment portions that wrap around an edge of the light guide layer, each of the optical films doubles back on itself around the light guide layer, the optical films include a first optical film and a second optical film, and a first bent alignment portion of the first optical film is interposed between the light guide layer and a second bent alignment portion of the second optical film while the first and second optical films are bent around the edge of the light guide layer.

2. The display defined in claim 1 wherein the edge of the light guide layer has a length and extends between opposing first and second sides of the light guide layer, wherein the first optical film has a bent edge portion that runs along the length of the edge of the light guide layer while wrapping around the edge of the light guide layer, and wherein the second optical film has bent protruding tabs that wrap around respective portions of the edge of the light guide layer.

3. The display defined in claim 1 wherein the optical films include a prism film and a diffuser film.

4. The display defined in claim 3 wherein the diffuser film has a bent edge portion wrapped around the edge of the light guide layer.

5. The display defined in claim 4 wherein the prism film comprises first and second bent protruding tabs wrapped around the edge of the light guide layer, wherein a first portion of the bent edge portion is interposed between the first bent protruding tab and the light guide layer, and wherein a second portion of the bent edge portion is interposed between the second bent protruding tab and the light guide layer.

6. The display defined in claim 1 wherein the pixels comprise liquid crystal display pixels, the display further comprising a reflector, wherein the light guide layer and the optical films are interposed between the reflector and the liquid crystal display pixels.

7. An electronic device, comprising:
    a support structure;
    an array of pixels configured to display an image; and
    a display backlight having a light guide layer that is configured to provide backlight illumination to the array of pixels and having flexible polymer films that are between the light guide layer and the pixels and that have bent alignment portions that wrap around an edge of the light guide layer and are coupled to the support structure, wherein the edge of the light guide layer has a length that extends between opposing first and second sides of the light guide layer, a given one of the bent alignment portions of a respective one of the flexible polymer films runs along the entire length of the edge of the light guide layer while wrapping around the edge, and the light guide layer is interposed between a first portion of the respective one of the flexible polymer films and a second portion of the respective one of the flexible polymer films.

8. The electronic device defined in claim 7 wherein the support structure comprises an electronic device housing.

9. The electronic device defined in claim 8 further comprising adhesive that attaches the flexible polymer films to the support structure.

10. The electronic device defined in claim 9 wherein at least one of the bent alignment portions comprises a bent protruding tab.

11. The electronic device defined in claim 10 wherein the bent protruding tab wraps around the edge and is bent back on itself and wherein the adhesive is configured to attach the bent protruding tab to the electronic device housing.

12. The electronic device defined in claim 8 wherein the bent alignment portions comprise a bent protruding tab, wherein the electronic device comprises tape that is configured to couple the bent protruding tab to the electronic device housing.

13. The electronic device defined in claim 12 wherein the tape has a non-sticky portion that overlaps the bent protruding tab to form a sliding joint that couples the bent protruding tab to the support structure while allowing the bent protruding tab to slide relative to the support structure.

14. The electronic device defined in claim 7 wherein the light guide layer has a notch and wherein the bent alignment portions overlap a portion of the edge in the notch.

15. The electronic device defined in claim 7 wherein the light guide layer has a notch and wherein the bent alignment portions overlap portions of the edge out of the notch.

16. An electronic device, comprising:
    a housing; and
    a display in the housing having a backlight that produces backlight illumination and having a pixel array that is illuminated by the backlight illumination, wherein the backlight comprises a light-emitting diode, a light guide layer that receives light from the light-emitting diode and that provides the backlight illumination to the pixel array, and a flexible polymer layer interposed between the light guide layer and the pixel array, wherein the flexible polymer layer has a bent protruding tab that is bent around an edge of the light guide layer and that is secured to the housing with an adhesive portion of a tape, and wherein the tape has a non-sticky portion that overlaps the bent protruding tab to form a sliding joint that couples the bent protruding tab to the housing while allowing the bent protruding tab to slide relative to the housing.

17. The electronic device defined in claim 16 wherein the flexible polymer layer comprises a prism film.

18. The electronic device defined in claim 16 wherein the flexible polymer layer is secured to a housing wall using the tape.

19. The electronic device defined in claim 16 wherein the flexible polymer layer comprises one of at least four optical films interposed between the light guide layer and the pixel array and wherein the optical films include at least two diffusers and at least two prism films each of which has a respective bent alignment portion coupled to the housing.

* * * * *